US012576907B2

(12) United States Patent
Wyciechowski et al.

(10) Patent No.: US 12,576,907 B2
(45) Date of Patent: Mar. 17, 2026

(54) MODEL PREDICTIVE BRAKE-TO-STEER CONTROL FOR AUTOMATED VEHICLES

(71) Applicants: Steering Solutions IP Holding Corporation, Auburn Hills, MI (US); Continental Automotive Systems, Inc., Auburn Hills, MI (US)

(72) Inventors: Michael S. Wyciechowski, Grand Blanc, MI (US); Iulian Ungureanu, Oakland Township, MI (US); Thomas Raste, Oberursel (DE); Scott T. Sanford, Swartz Creek, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 122 days.

(21) Appl. No.: 18/458,632

(22) Filed: Aug. 30, 2023

(65) Prior Publication Data

US 2024/0075981 A1 Mar. 7, 2024

Related U.S. Application Data

(60) Provisional application No. 63/404,218, filed on Sep. 7, 2022.

(51) Int. Cl.
B62D 5/04 (2006.01)
B60W 10/18 (2012.01)
(Continued)

(52) U.S. Cl.
CPC ........... B62D 5/0484 (2013.01); B60W 10/18 (2013.01); B60W 30/18109 (2013.01);
(Continued)

(58) Field of Classification Search
CPC ...... B62D 5/0484; B62D 5/003; B62D 9/005; B60W 10/18; B60W 30/18109;
(Continued)

(56) References Cited

U.S. PATENT DOCUMENTS 8,670,903 B2 * 3/2014 Lee ..................... B62D 15/025
701/28
10,046,743 B2 8/2018 Jonasson et al.
(Continued)

FOREIGN PATENT DOCUMENTS

CN 110217227 B 9/2020
CN 111301425 B 8/2022
(Continued)

OTHER PUBLICATIONS

DE Office action dated Feb. 11, 2025 for DE application No. 10 2023 123 965.1.
(Continued)

*Primary Examiner* — Sizo B Vilakazi
(74) *Attorney, Agent, or Firm* — Ingrassia Fisher & Lorenz, LLP

(57) ABSTRACT

Disclosed is a method using a brake-to-steer model predictive control to providing a limited level of lateral control for self-driving or semi-self-driving vehicles, when a component of a vehicle steering system fails or is failing.

20 Claims, 7 Drawing Sheets

(51) Int. Cl.

| | |
|---|---|
| *B60W 30/18* | (2012.01) |
| *B60W 40/105* | (2012.01) |
| *B60W 50/00* | (2006.01) |
| *B60W 50/029* | (2012.01) |

(52) U.S. Cl.
CPC ...... *B60W 40/105* (2013.01); *B60W 50/0097* (2013.01); *B60W 50/029* (2013.01); *B60W 2050/0031* (2013.01); *B60W 2050/0292* (2013.01); *B60W 2510/182* (2013.01); *B60W 2710/182* (2013.01)

(58) Field of Classification Search
CPC .......... B60W 40/105; B60W 50/0097; B60W 50/029; B60W 2050/0031; B60W 2050/0292; B60W 2510/182; B60W 2710/182; B60T 2260/02; B60T 2270/402
See application file for complete search history.

(56) References Cited

U.S. PATENT DOCUMENTS

| | | | |
|---|---|---|---|
| 10,046,749 | B2 | 8/2018 | Jonasson et al. |
| 2007/0299580 | A1* | 12/2007 | Lin ....................... B60W 50/16 701/41 |
| 2020/0089244 | A1* | 3/2020 | Zhang ................. G05D 1/0088 |
| 2022/0111895 | A1 | 4/2022 | Schumann et al. |
| 2023/0058353 | A1 | 2/2023 | LaBarbera et al. |
| 2023/0119160 | A1 | 4/2023 | LaBarbera et al. |
| 2023/0119249 | A1 | 4/2023 | LaBarbera et al. |
| 2023/0121296 | A1 | 4/2023 | LaBarbera et al. |
| 2023/0124821 | A1 | 4/2023 | LaBarbera et al. |

FOREIGN PATENT DOCUMENTS

| | | |
|---|---|---|
| DE | 102012212301 A1 | 1/2013 |
| DE | 102017118401 A1 | 2/2018 |

OTHER PUBLICATIONS

Wikipedia: Nonlinear model-based predictive control; Jun. 25, 2020; URL: https://de.wikipedia.org/w/index.php?title=Nichtlineare_modellbasierte_pr%C3%A4diktive_Regelung&oldid=201297921. html [accessed on Jun. 2, 2025].

Michael S. Wyciechowski et al.; Model Predictive Brake-to-Steer Control for Automated Vehicles; filed Sep. 7, 2022 and assigned U.S. Appl. No. 63/404,218.

Michael S. Wyciechowski et al.; Brake-to-Steer for Steer-by-Wire Control Algorithm Using Support From Tertiary Steering Actuation; filed Aug. 3, 2023 and assigned U.S. Appl. No. 18/363,982.

Alexander Jennings et al.; Brake-to-Steer Lateral Stability Management Based on Stability Indicator Correlation ; filed Aug. 3, 2023 and assigned U.S. Appl. No. 18/365,057.

Alexander Jennings et al.; Brake-to-Steer Lateral Stability Management Based on Stability Indicator Correlation ; filed Aug. 3, 2023 and assigned U.S. Appl. No. 18/365,064.

Alexander Jennings et al.; Brake-to-Steer Lateral Stability Management Based on Stability Indicator Correlation ; filed Aug. 3, 2023 and assigned U.S. Appl. No. 18/365,073.

Michael S. Wyciechowski et al.; Brake-to-Steer Lateral Stability Management Based on Stability Indicator Correlation ; filed Aug. 3, 2023 and assigned U.S. Appl. No. 18/365,042.

Master's thesis in Automotive Engineering Brake Control for Lateral Vehicle Dynamics Anders Larsson et al. ; 85 pages Department of Applied Mechanics ,Chalmers University of Technology https://odr.chalmers.se/bitstreams/1942a68e-e4a4-47e1-952f-ec6df3e92d1e/download.

\* cited by examiner

MODEL PREDICTIVE BRAKE-TO-STEER CONTROL FOR AUTOMATED VEHICLES

CROSS-REFERENCE TO RELATED APPLICATIONS

This application claims the benefit of U.S. Provisional Application No. 63/404,218, filed Sep. 7, 2023.

TECHNICAL FIELD

The field to which the disclosure generally relates to includes self-driving (autonomous) and semi-self-driving (semi-autonomous) vehicles.

BACKGROUND

Highly automated vehicles require certain levels of redundancy in the systems that help control the vehicle. The steering system is one of these. The reason for this redundancy is so that no single point failure leads to loss of directional control of the vehicle. It is standard for these steering systems to have two controllers. Should one fail the second is still available so that the vehicle can be safely controlled. However, the risk is now much higher, as a future failure can lead to loss of directional control, so the duration of operation in this mode must to be fairly short. Just long enough to finish the journey or in some cases a minimum risk maneuver must be performed, and the journey is cut short.

SUMMARY OF ILLUSTRATIVE VARIATIONS

A number of illustrative variations may include a method using a brake-to-steer model predictive control to providing a limited level of lateral control for self-driving or semi-self-driving vehicles, when a component of a vehicle steering system fails or is failing.

A number of illustrative variations may include a product comprising a computer readable medium comprising: non-transitory memory having instructions stored thereon executable by an electronic processor, the instructions when executed by the electronic processor implement the following functions comprising: using vehicle speed data in a linear predictive varying model to provide a prediction model and sending the predictive model to a model predictive control module; using the predictive model and at least one of side slip angle data, steering angle data, curvature of the trajectory data, cross track error data, or heading data in the model predictive control module to calculate four brake pressure commands.

A number of illustrative variations may include a method comprising: determining that a component of a vehicle steering system has failed or failing and in respond thereto using vehicle speed data in a linear predictive varying model to provide a prediction model and sending the predictive model to a model predictive control module; using the predictive model and at least one of side slip angle data, steering angle data, curvature of the trajectory data, cross track error data, or heading data in the model predictive control module to calculate four brake pressure commands.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

MPC is an optimal control technique that computes control actions by minimizing a cost function based on the prediction of the vehicle states from a vehicle model over horizon. Brake-to-steer (BTS) model predictive control (MPC) accepts inputs of curvature of the trajectory sent from the planner, cross track error (dY), and heading error (dPsi) of the ego location relative to the trajectory.

Over a specified prediction horizon, the BTS MPC performs a state estimation calculation. A cost function is defined as prediction compared to the reference trajectory. The cost is sent to a solver which determines a global optimal solution that minimizes the cost function (we minimize cross track and heading error). The solver minimizes the cost function with respect to a set of constraints (a representation of real-world limitations of the components of the vehicle). For example, the constraint may represent how much force the tire could provide. The optimal command for brake force is converted to pressure commands and then sent to the brake controller. The vehicle will yaw as a result of the braking forces and follow the reference trajectory.

Brake-to-steer (BTS) model predictive control (MPC) strategy is more capable than known prior art because it uses an intuitive knowledge of the dynamics of the vehicle to come up with optimal solutions to apply braking forces to steer the vehicle. It also will continuously at each time step come up with a new optimal solution numerically, rather than just once at the setup of the function as control strategies with a closed form solution do. This can make for a more accurate controller in varied driving conditions. It can also be fed adaptive constraints, such as a lower force threshold if the vehicle determines it is on snow or ice.

This problem could also be solved with tertiary hardware redundancy, however the cost of that would be high. Brake-to-steer (BTS) model predictive control (MPC) is a software only solution that can be implemented on multiple control modules that already exist on the vehicle. There would be a significant cost savings to using brake-to-steer (BTS) model predictive control (MPC) in place of hardware as a tertiary redundancy.

If ECU1 (electronic control unit 1) of a steering system on an automated vehicle fails, the vehicle is allowed to finish its journey on ECU2 (electronic control unit 2), with knowledge that BTSMPC is ready to assume lateral control in case of a failure of ECU2. The manager/owner of the vehicle schedules service for the steering system to be replaced. The vehicle is allowed a limited mode of operation until the service can be completed. This is much less disruptive than a system with no tertiary backup. Which would be forced to search for the nearest safe space to stop the vehicle.

Figure 1:
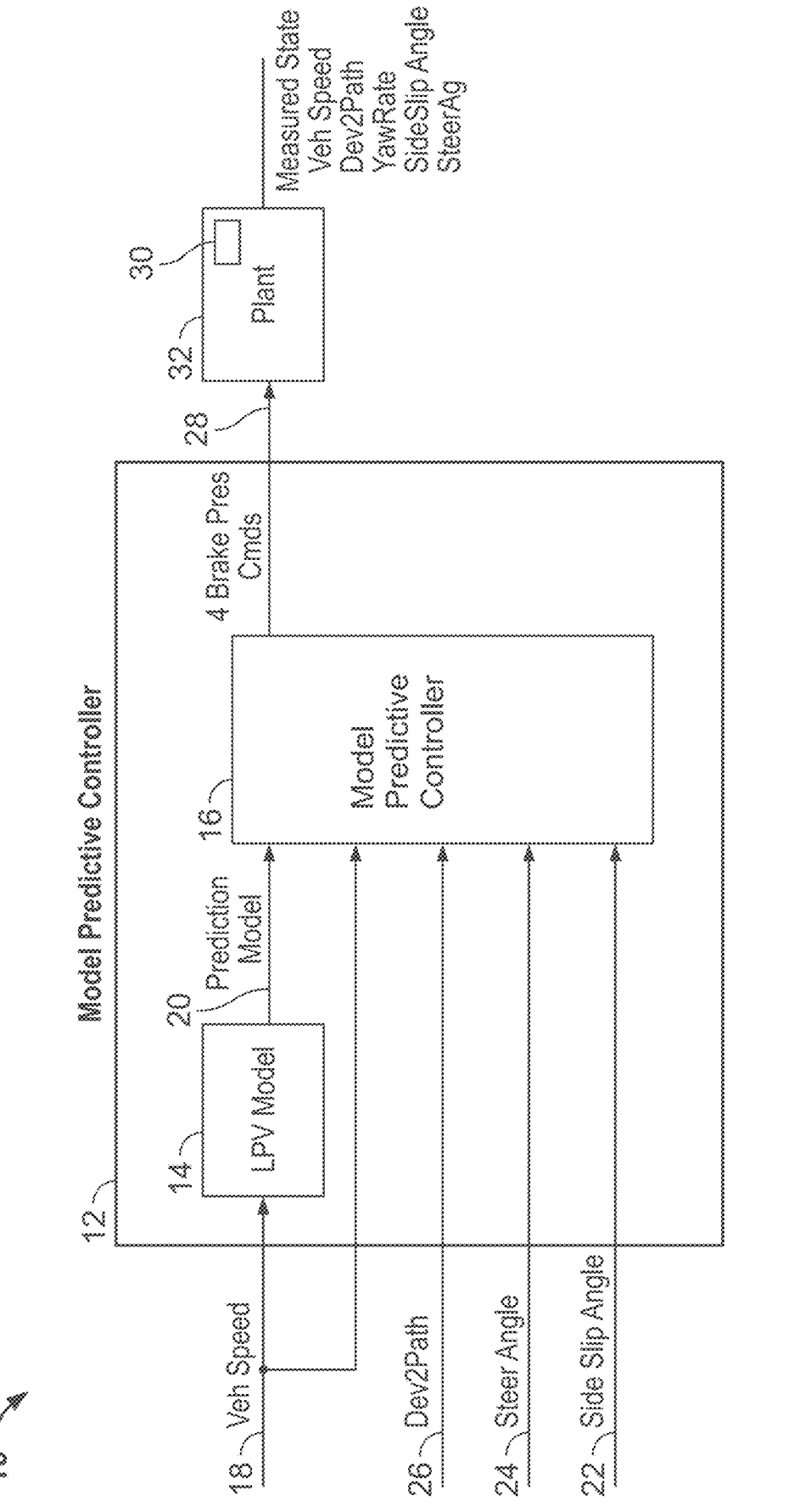
FIG. 1 illustrates a method, system and instructions for the BTS Model Predictive Controller according to a number of variations.

FIG. 1 illustrates a method, system and instructions for the BTS Model Predictive Controller 10. A BTS module 12 may include a linear parameter varying model (LPV model) 14 and the MPC 16. Vehicle speed data may be received by or retrieved by the LPV model. The LPV model interpolates based on vehicle speed to provide an accurate prediction model as vehicle dynamics change as the vehicle speeds up or slows down. This prediction model 20 is then sent to the MPC 16, which then performs the state estimation and optimization over the prediction horizon.

The MPC 16 may receive or obtain stored data which may include at least one of side slip angle data 22, steering angle data 24, or Dev2Path data 26. The Dev2Path data 26 may include at least one of curvature of the trajectory data, cross track error data, or heading error data.

The MPC 16 then outputs four separate brake pressure commands 28 that are sent to the brake controller 30, which applies the four brake pressure commands to the four wheel of the vehicle, respectively, so that brake pressure at each wheel may be selectively different which causes the vehicle to respond to follow the desired trajectory. The plant block 32 represents the vehicle. This is a standard method to illustrate a controller and the system which it controls.

Figure 2:
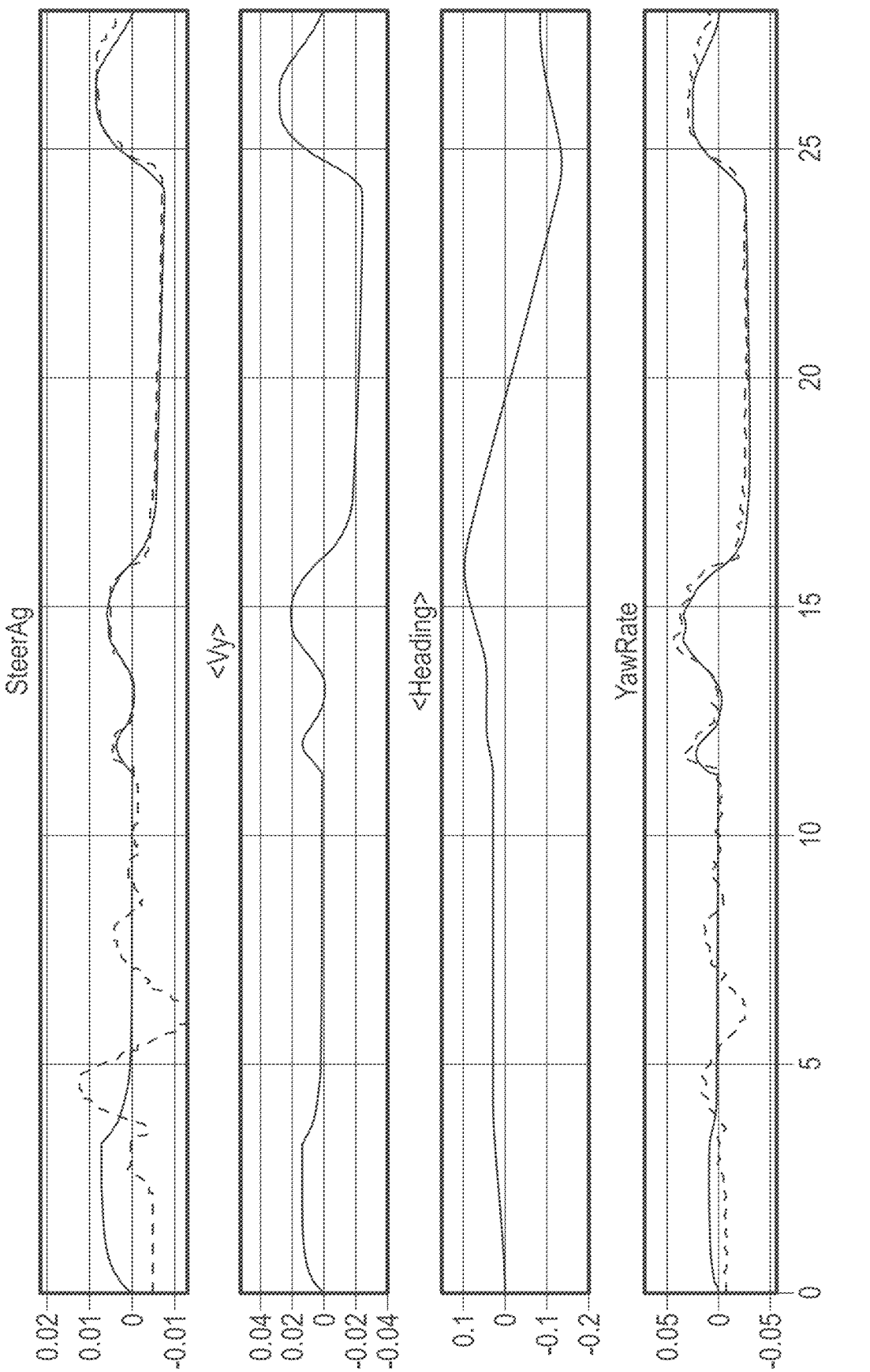
FIG. 2 illustrates the accuracy of the prediction model in at least situation.

FIG. 2 illustrates the accuracy of the prediction model 20. The key graph is the YawRate. The noisy trace (lower line 34 at the left (vertical) axis) is actual yaw rates collected from the vehicle while driving with BTS. Overlayed on top of it (upper line 36 at the left (vertical) axis) is the output from the model. It lines up fairly well with the real world data, indicating this model is accurate and useful for our model predictive controller.

Modern motion and stability systems for autonomous and manual driving should meet increased requirements for energy efficiency, safety and driving dynamics. These requirements can preferably systematically be taken into account by constraints for a model predictive controller (MPC).

Figure 3:
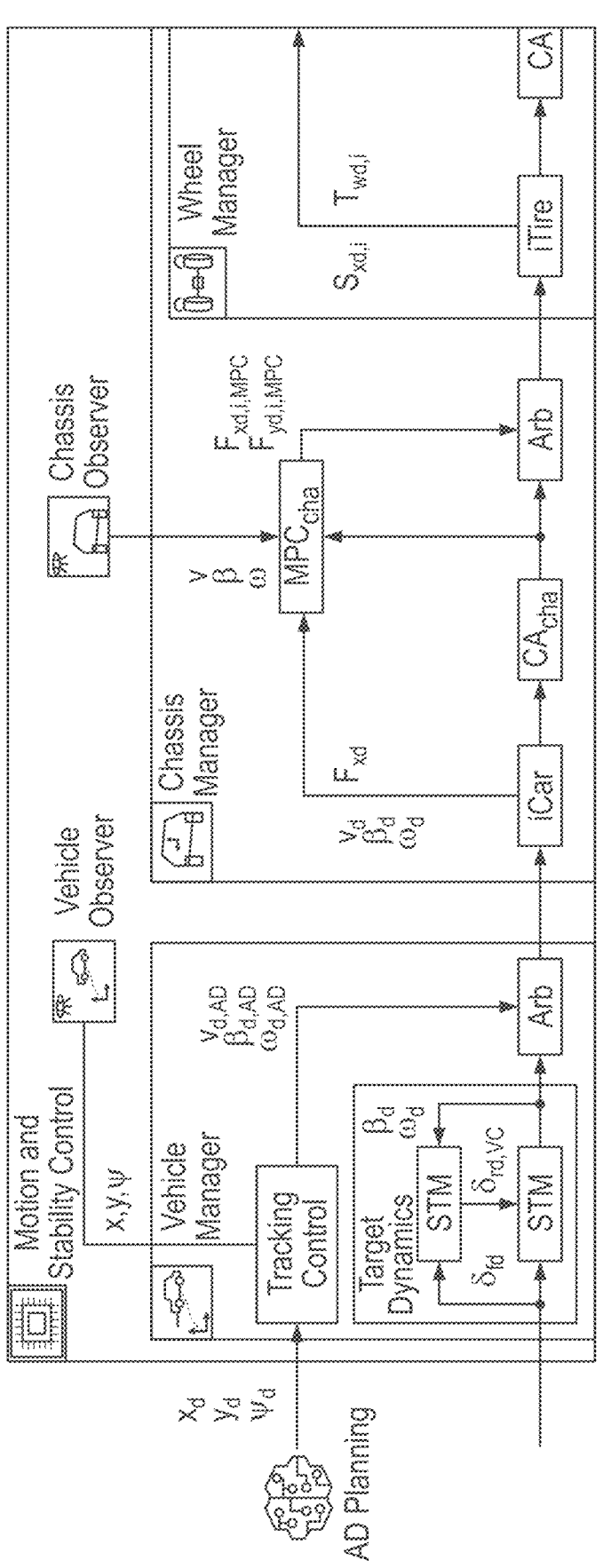
FIG. 3 illustrates motion and stability control reference architecture useful in a number of variations.

The motion and stability control reference architecture illustrated in FIG. 3 shows the interconnections of the services from a signal-based control perspective rather than a service-based communication. The system is composed for an electric vehicle with six individually controllable smart actuators: Friction brakes at each wheel and electric motors at each front wheel. Details of the system are described in Raste, Thomas; Hohm, Andree; Eckert, Alfred, 2021. Holistic Motion Control for Personalized and Efficient Vehicle Dynamics. Prague: FISITA World Congress.

Referring again to FIG. 3 the motion and stability reference architecture with single track model (STM), virtual rear steer angle control (VC), static control allocation (CA), inverse vehicle model (iCar), inverse tire model (iTire), model predictive control (MPC) and arbitration (Arb) services.

The reference architecture shown in FIG. 3 includes feedforward and feedback control parts. Input to the system are driver requested acceleration $a_{xd}$ and front steer angle delta$_{fd}$ and from an AD planning module a targeted vehicle pose with longitudinal and lateral position $x_d$, $y_d$ and yaw angle psi$_d$. Outputs are the commanded motor torques $T_{md}$ and brake torques $T_{bd}$. Not shown are the sensor inputs and the capability feedback from the actuators. The feedforward control includes customizable target vehicle dynamics which provides a desired vehicle state with speed $v_d$, side slip angle beta$_d$ and yaw rate omega$_d$. The target dynamics is translated into total longitudinal and lateral forces $F_{xd}$, $F_{yd}$ respectively and yaw moment $M_{zd}$. The chassis MPC tracks the desired vehicle state and ensures agility and stability by torque vectoring with dynamic control allocation of the total forces and moment to eight horizontal wheel forces $F_{xd,i}$, $F_{yd,i}$, i=1, . . . , 4. Inverse tire models determine for each wheel the desired longitudinal wheel slip $s_{xd,i}$ and wheel torque $T_{wd,i}$. Wheel MPCs track the torques and slips and dynamically allocate the torques at the front wheels to the electric motors and friction brakes to maximize energy efficiency by recuperation.

Figure 4:
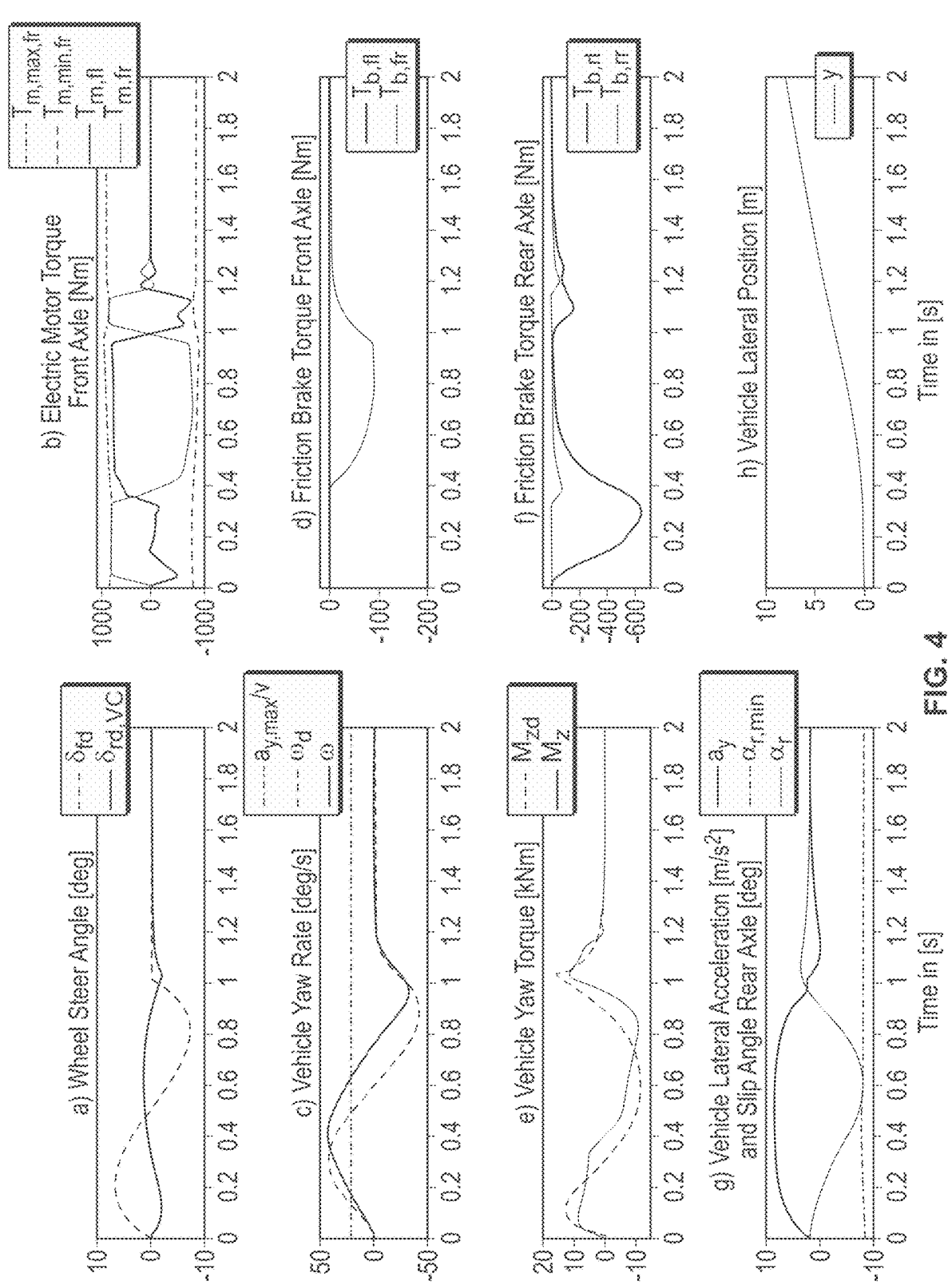
FIG. 4 depicts graphs of various parameters associated with a test case is a collision avoidance maneuver of a vehicle using BTS MPC at the limits of handling at 80 km/h illustrating the torque vectoring capability to improve agility and at the same time stability.

The test case is a collision avoidance maneuver at the limits of handling at 80 km/h illustrating the torque vectoring capability to improve agility and at the same time stability, cf. FIG. 4. The vehicle is driven manually with open-loop front steer angle input by the driver. The rear steer angle is purely virtual and controls the yaw rate response of the virtual single track model in the vehicle manager. In order to follow the high-dynamic yaw request closely the chassis MPC allocates the forces accordingly taking a high rear side slip angle into account. The whole control is accomplished by torque vectoring only, i.e. no active steer angle control besides driver input is in operation. The dynamics is quite impressive, a 3 m lateral displacement is reached after 1 s. This is only possible, because the stability envelope allows a higher transient yaw rate compared to the common static limit indicated by $a_{ymax}/v$.

Figure 5:
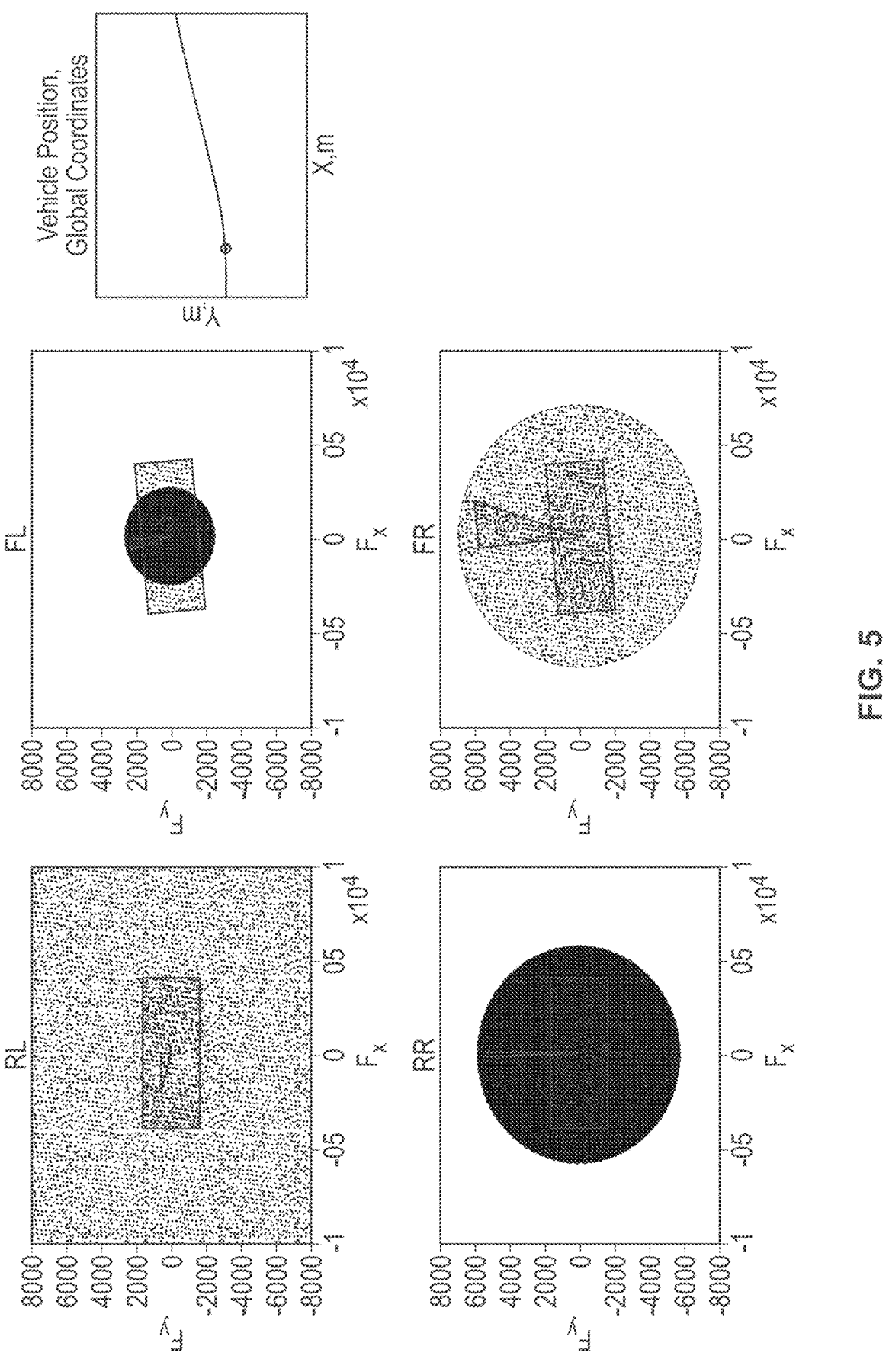
FIG. 5 is a depiction of a visualization of the Kamm circles and tire forces during the collision avoidance maneuver at sample time t=0.32 s.

FIG. 5 is a depiction of a visualization of the Kamm circles and tire forces during the collision avoidance maneuver at sample time t=0.32 s. In FIG. 5 is shown for a specific sample time the result of stabilization and optimal wheel force allocation (torque vectoring). The optimal solution is based on the knowledge of the Kamm circles at the wheels and the vehicle dynamics limits. Centrifugal forces are built up in every steering maneuver while driving, then being absorbed again by the lateral guidance forces in the wheels. A Kamm circle is a model illustrating the distribution of the x and y forces on the wheels and the connection between dynamic driving forces and friction. The circumference of the circle represents the limit to the tire's grip. Acceleration and lateral forces are shown as arrows. The power vector resulting from the combination of the two adds up to provide the total forces acting on the tires. Should this arrow extend beyond the circle, the force involved is greater than the grip of the wheels and the bike will get out of control. The graph labeled RL is a Kamm circle for the rear left tire of the vehicle. The graph labeled RR is a Kamm circle for the rear right tire of the vehicle. The graph labeled FL is a Kamm circle for the front left tire of the vehicle. The graph labeled FR is a Kamm circle for the rear left tire of the vehicle. The right, left, front, rear are made with respect to the forward driving direction of the vehicle.

Figure 6:
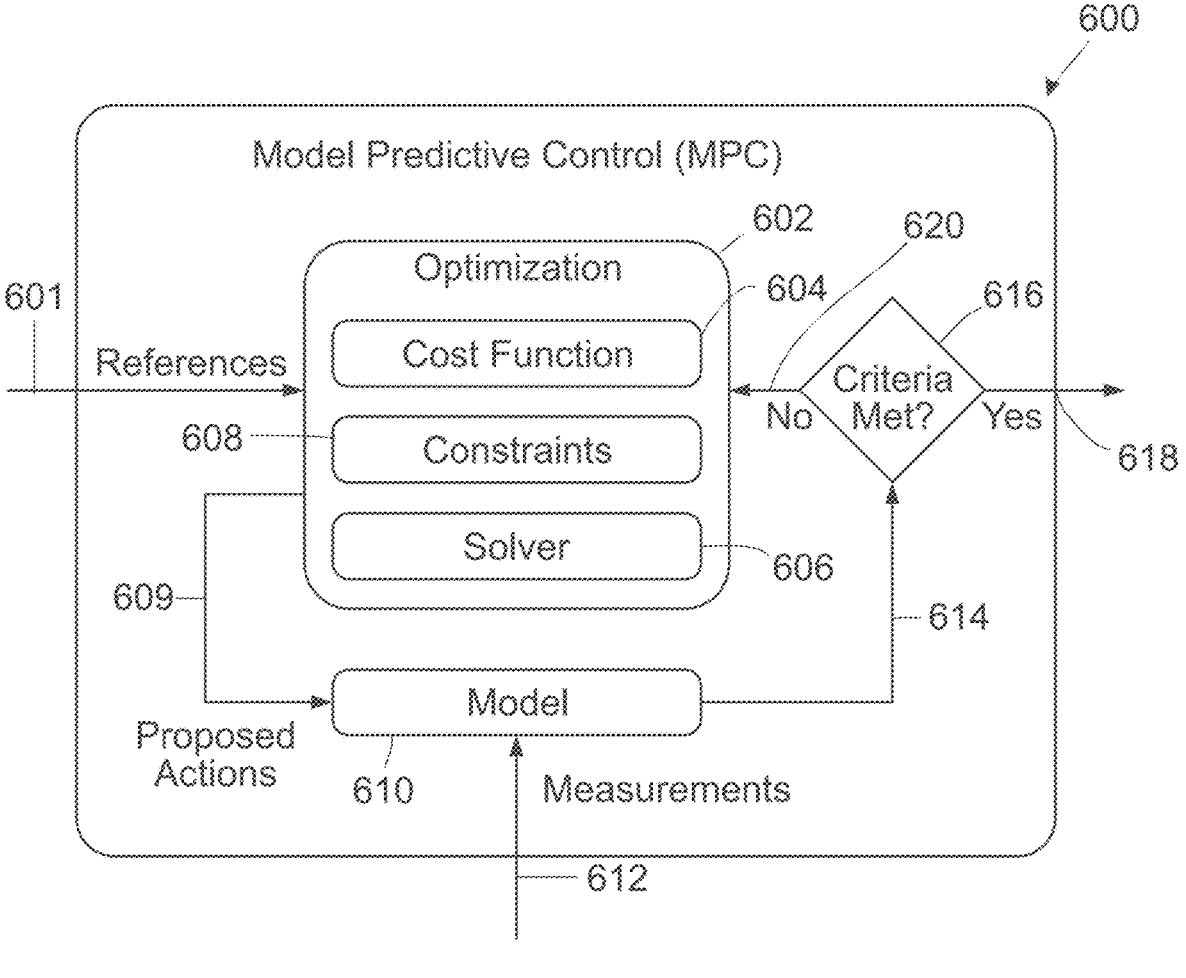
FIG. 6 is a schematic illustration of a model predictive controller, and the functions and methods carried out thereby according to a number of variations

Referring to FIG. 6, the BTS MPC 600 performs a state estimation using reference inputs 601 and preforms a calculation or optimization process or optimizer 602. A cost function 604 is defined as prediction compared to the reference trajectory. The function cost 604 is sent to a solver 606 which determines a global optimal solution that minimizes the cost function (e.g., minimize cross track and/or heading error). The solver 606 minimizes the cost function 604 with respect to a set of constraints 608 (a representation of real-world limitations of the components of the vehicle). For example, the constraint 608 may represent how much force the tire could provide. The force the tire can provide may be different if the vehicle is on ice or snow. The optimization 602 provides an output of proposed actions 609, for example, brake pressure commands for each of four wheels of the vehicle and/or propulsion commands at each of four wheel or a pair of front wheels or a pair of rear wheel. A model 610 performs the comparison or mathematic representation using the proposed actions and measurements 612. The measurements 612 are provide by vehicle sensors or other vehicle component. The model 610 send an output 614 that the MPC 600 determines 616 if the output 614 is within an acceptable predetermined range of a criteria. If yes, the output 614 is sent (line 618) as brake commands. If no, the output 614 is returned (line 620) to the optimization process or optimizer 602. The optimal command for brake force is converted to pressure commands and then sent to the brake controller. The vehicle will yaw as a result of the braking forces and follow the reference trajectory.

Vehicles may be configured for autonomous driving functionality such as, but not limited to, driver assistance, partial driving automation, conditional driving automation, high driving automation, full driving automation, lane keep assist, park assist, adaptive cruise control, obstacle avoidance, and others.

A vehicle's steering system may also be autonomous in that the vehicle may propel, steer, or brake itself to approach a predetermined location that has been communicated to it with or without assistance or interference from a driver. The vehicle's steering system may have an obstacle avoidance system that allows the vehicle to sense objects in its path and avoid them. The vehicle's steering system may have a motion planner or trajectory planning system that allows the vehicle to plan the vehicle path, which may be carried out by one or more controllers, such as, but not limited to, controller 808, 818 shown in FIG. 7. In some cases, the driver of the vehicle may wish to assist the vehicle in avoiding an object, or to change direction, such as changing driving lanes, of the vehicle without first communicating that wish to the vehicle in some other manner. In such a case, the driver may take control of the driver-side steering system controls and assist the autonomous steering system.

Degrees of autonomous driving functionality may be achieved, at least, vehicle via sensors configured to capture, observe, measure, or calculate environmental data or vehicle data in conjunction with motion planning or trajectory planning. Vehicle sensors may include sensors associated with cargo or passenger vehicles such as, park assist sensors, blind spot detection sensors, surround sensors, collision warning sensors, traffic sign or signal recognition sensors, emergency brake, pedestrian detection, collision avoidance sensors, or cross traffic sensors. Vehicle sensors may include radar, lidar, cameras, global positions system (GPS), global navigation satellite systems (GNSS), environmental sensors, or the like. Vehicle sensors may perform a variety of functions with respect to detecting, reading, recognizing, or interpreting data associated with local surroundings, operating environment, and vehicle data. Data from vehicle sensors may be stored in analog or digital form and obtained, retrieved, received, or used during implementation of written instructions stored on computer readable medium when executed by an electronic processor.

During operation of a vehicle implementing an autonomous driving system such as lane-keeping functionality, a vehicle may drive along a relatively flat and straight stretch of road. During operation, the system may include a motion controller that may receive a trajectory path from a trajectory planner. Based on the trajectory path, the motion planner may calculate steering, propulsion, or braking actuation outputs required to achieve the trajectory path, including intermediate actuations, and may determine a physical model for prediction of the vehicle behavior given the planned actuations. The model may be used to generate trajectory boundaries of expected accelerations and rotations of the vehicle body at a given interval in the motion plan.

To achieve a desired trajectory, a motion controller may calculate a set of steering, propulsion, or braking actuation commands to follow the desired path over a predetermined period of time, such as the next few seconds. At the same time, the motion controller may predict a set of acceleration and rotational limits the vehicle will stay within at various points during an interval of time.

To keep all actuators within desired operational readiness, the choice of actuators used to maintain the requested trajectory may be constantly or routinely evaluated and adjusted.

When an electronic steering system includes a component such as, but not limited to, a powerpack or electric motor in a power steering system that have failed, or rack and pinion actuators or controllers in a steer by wire system that have failed, a brake-to-steer algorithm may be executed by an electronic processor to issue actuation commands to produce brake pressure requests communicated to individual wheels as a function of vehicle state information. The vehicle state information may include, for example, at least one of lateral acceleration or yaw rate, and if available, steering sensor measurements which may include, for example, at least one of torque or angle. Brake pressure requests may be calculated in such a way as to provide enough braking force on at least one roadwheel to generate a yaw torque, which in turn generates a lateral force that supplements the lateral force induced by the driver's manual steering, or substitutes steering forces generated by a steering command in a failed or partially failed steering system for a steer by wire or autonomous vehicle. This may allow the vehicle to achieve higher yaw rate during a wide range of maneuvers, which may include but not limited to, an evasive maneuver that it would have otherwise not achieved with a failed electronic steering system. The method and brake-to-steer algorithm may reduce the required driver input force to improve controllability and safety, or may provide a means for lateral control for the driver or autonomous controller in a situation where there would ordinarily be none.

Steering wheel and vehicle state information may be used as an input to a brake-to-steer system while electronic power steering assist system has failed or partially failed. The brake-to-steer system may be used to add additional yaw torque to the driver induced steering angle in the event of an evasive maneuver, thus helping the driver achieve higher yaw rates in an emergency avoidance maneuver while the electronic power steering assist system is not operational and not able to provide assist. Vehicle dynamic signals indicating the state of the vehicle's motion may be utilized, and steering sensor signals when available. Alternatively, the function could be achieved to enhance lateral response during evasive maneuvers when the electronic power assist system is operational, partially operational, or beginning to fail.

Figure 7:
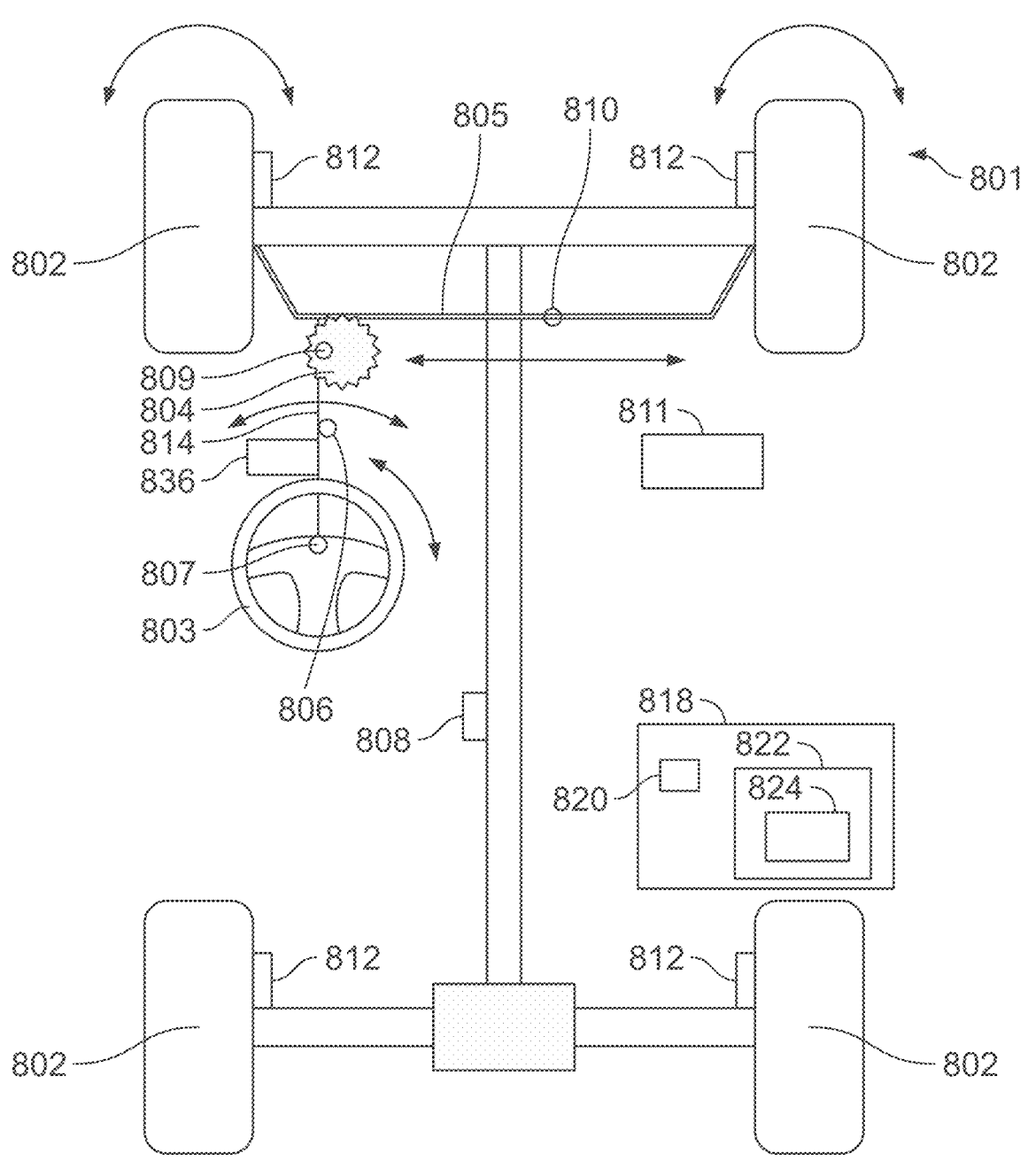
FIG. 7 is a schematic illustration of a vehicle according to a number of variations.

Referring now to FIG. 7, an illustrative variation of a vehicle equipped with hardware that allows it to carry out at least some of the methods and functionality disclosed herein is shown. All sensors depicted in the illustrative variation are illustrative, so the sensed inputs may come from various other vehicle locations or vehicle sensors given they provide a similar sensing function. A vehicle 801 may be equipped with roadwheels 802 and a steering wheel or steering interface 803 for turning the roadwheels 802 via a pinion 804 that engages a rack 805 that is constructed and arranged to turn the roadwheels 802. In the illustrative variation shown, the steering wheel or steering interface 803 may be equipped with a hand wheel torque sensor 806 and a hand wheel angle sensor 807 so that any turning of the handwheel may produce sensor data that may be communicated to or accessed by a controller 808. A variety of other sensors 811 positioned in the vehicle and operative connected to at least one controller 808, 818. Again, such sensors 811 may include, but not limited to, sensors associated with cargo or passenger vehicles such as, park assist sensors, blind spot detection sensors, surround sensors, collision warning sensors, traffic sign or signal recognition sensors, emergency brake, pedestrian detection, collision avoidance sensors, or cross traffic sensors. Vehicle sensors may include radar, lidar, cameras, global positions system (GPS), global navigation satellite systems (GNSS), environmental sensors, or the like. Vehicle sensors may perform a variety of functions with respect to detecting, reading, recognizing, or interpreting data associated with local surroundings, operating environment, and vehicle data. Data from vehicle sensors may be stored in analog or digital form and obtained, retrieved, or used during implementation of written instructions stored on computer readable medium when executed by an electronic processor. Controller 808 may provide all other functionality described herein including Brake-to-Steer, Brake-to-Steer Stability, steer-by-wire control, powertrain control, braking control, control a vehicle system, or one or more other controllers may be provided to do the same. Although, in this illustrative variation, the controller 808 is shown onboard the vehicle, the controller may also be located somewhere apart from the vehicle and communicated with wirelessly by the sensors or the vehicle. Pinion 804 may be equipped with a pinion torque sensor 809 so that any turning of the pinion may be observed by or communicated to the controller 808 and utilized by the methods described herein. In the illustrative variation shown, rack 805 may be equipped with a rack force sensor 810 so that any rack forces detected during driving may be observed by or communicated to the controller 808 and utilized by the methods described herein. The vehicle may have a steering shaft 814 connecting the steering wheel or steering interface 803 to a pinion 804. An electric power steering assist or hydraulic power steering device 836 may be connected to the shaft 814 to assist the driver in steering the roadwheels of the vehicle by reducing the force or torque the driver would need to apply to the steering wheel or steering interface 803 if the power steering device 836 was not present. Also shown in this illustrative variation, the roadwheels 802 may be equipped with roadwheel sensors so that any roadwheel data detected during driving may be observed by or communicated to the controller 808 and utilized by the methods described herein.

Additionally, in the illustrative variation shown, brakes 812 are located near roadwheels 802. Controller 808 and any other controller, for example controller 818, may be provided to carry out one or more functions described herein and may include a processor 820, memory 822, wherein the instructions 824 stored in the memory 822 are executable by the processor 820 to determine if the hand wheel angle sensor 807 or if the pinion 804, rack 805, pinion sensor 809, or rack sensor 810 have failed. Furthermore, wherein the instructions 824 stored in memory 822 are executable by the processor 820 to carry out any of the methods or achieve any functionality described herein.

Modules and controllers described herein may include software, hardware, or a computing device including non-transitory computer readable medium, such as but not limited to memory, having instructions stored there on, and a processor for executing the instructions to perform the acts, steps, methods and functionality described herein. Multiple modules and controllers and their associated acts, steps, methods and functionality may be contained in or achieved by one or more computing devices.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Variation 1 may include a method using a brake-to-steer model predictive control to providing a limited level of lateral control for self-driving or semi-self-driving vehicles, when a component of a vehicle steering system fails or is failing.

Variation 2 may include a method as set forth in Variation 1 wherein the component of the vehicle steering system is a steering rack actuator.

Variation 3 may include a product comprising a computer readable medium comprising: non-transitory memory having instructions stored thereon executable by an electronic processor, the instructions when executed by the electronic processor implement the following functions comprising: using vehicle speed data in a linear predictive varying model to provide a prediction model and sending the predictive model to a model predictive control module; using the predictive model and at least on of side slip angle data, steering angle data, curvature of the trajectory data, cross track error data, or heading data in the model predictive control module to calculate four brake pressure commands.

Variation 4 may include a product as set forth in Variation 3 wherein at least one of the four brake pressure commands is different than another one of the four brake pressure commands.

Variation 5 may include a product as set forth in any of Variations 3-4 further comprising outputting the four brake commands.

Variation 6 may include a product as set forth in any of Variations 3-4 further comprising outputting the four brake commands to a brake controller.

Variation 7 may include a product as set forth in any of Variations 3-6 wherein the model predictive model, over a specified prediction horizon, performs a state estimation calculation.

Variation 8 may include a product as set forth in any of Variations 3-7 wherein the model predictive model includes an optimizer which produces a cost function as prediction compared to the reference trajectory.

Variation 9 may include a product as set forth in of Variation 8 wherein the cost function is sent to a solver which determines a global optimal solution to applying brake pressure to steer the vehicle that minimizes the cost function with respect to a set of constraints.

Variation 10 may include a product as set forth in of Variation 9 wherein the set of constraints represents how much force the tire can provide.

Variation 11 may include a product as set forth in any of Variations 9-10 wherein the solver continuously at each time stamp determines a new global optimal solution to applying brake pressure to steer the vehicle that minimizes the cost function with respect to a set of constraints.

Variation 12 may include a product as set forth in any of Variations 9-11 further comprising the solver receiving or obtaining an adaptive constraint.

Variation 13 may include a product as set forth in Variation 12 wherein the adaptive constraint is a lower force the tire can apply.

Variation 14 may include a product as set forth in Variations 13 wherein the solver receiving or obtaining an adaptive constraint is based on a determination that the vehicle is on ice or snow.

Variation 15 may include a product as set forth in any of Variations 3-14 wherein the using comprises using each of the side slip angle data, steering angle data, curvature of the trajectory data, cross track error data, and heading data in the model predictive control module to calculate four brake pressure commands.

Variation 16 may include a method comprising: determining that a component of a vehicle steering system has failed or failing and in respond thereto using vehicle speed data in a linear predictive varying model to provide a prediction model and sending the predictive model to a model predictive control module; using the predictive model and at least one of side slip angle data, steering angle data, curvature of the trajectory data, cross track error data, or heading data in the model predictive control module to calculate four brake pressure commands.

Variation 17 may include a method as set forth in Variation 16 wherein at least one of the four brake pressure commands is different than another one of the four brake pressure commands.

Variation 18 may include a method as set forth in any of Variations 16-17 further comprising outputting the four brake commands.

Variation 19 may include a method as set forth in any of Variations 16-17 further comprising outputting the four brake commands to a brake controller to steer the vehicle.

Variation 20 may include a method as set forth in any of Variations 16-19 wherein the model predictive model includes an optimizer which produces a cost function as a prediction compared to the reference trajectory, wherein the cost function is sent to a solver which determines a global optimal solution to applying brake pressure to steer the vehicle that minimizes the cost function with respect to a set of constraints, wherein the set of constraints represents how much force the tire can provide.

The above description of select examples of the invention is merely illustrative in nature and, thus, variations or variants thereof are not to be regarded as a departure from the spirit and scope of the invention.

What is claimed is:

1. A method using a brake-to-steer model predictive control to providing a limited level of lateral control for self-driving or semi-self-driving vehicles, when a component of a vehicle steering system fails or is failing, the method comprising:

continuously calculating, at every time stamp, a cost function using a model predictive control module based on at least a predictive slip angle and heading error of a vehicle to provide a calculated cost function;

estimating a limit of a force that each tire of the vehicle can provide to provide an estimated tire force limit;

generating a brake pressure command for each tire of the vehicle to minimize deviation from a target trajectory based upon at least the calculated cost function.

2. A method as set forth in claim 1 wherein the component of the vehicle steering system is a steering rack actuator, and further comprising generating a propulsion command based on a calculated cost function, and wherein the generating a brake pressure command for each tire of the vehicle to minimize deviation from a target trajectory is further based upon the estimated tire force limit.

3. A product comprising a computer readable medium comprising:

non-transitory memory having instructions stored thereon executable by an electronic processor, the instructions when executed by the electronic processor implement the following functions comprising:

using vehicle speed data in a linear predictive varying model to provide a prediction model and sending the predictive model to a model predictive control module;

using the predictive model to calculating a cost function based on at least a predictive slip angle and heading error of a vehicle to provide a calculated cost function;

estimating the force that each tire of the vehicle can provide to provide an estimated tire force limit; and generating four brake pressure commands, one brake command for each tire of the vehicle, to minimize deviation from a target trajectory based upon the calculated cost function and the estimated tire force limit.

4. A product as set forth in claim 3 wherein at least one of the four brake pressure commands is different than another one of the four brake pressure commands and further comprising generating a propulsion command based on a calculated cost function.

5. A product as set forth in claim 3 further comprising outputting the four brake commands, wherein the generating four brake pressure commands, one brake command for each tire of the vehicle, to minimize deviation from a target trajectory is further based upon steering angle data.

6. A product as set forth in claim 3 further comprising outputting the four brake commands to a brake controller, wherein the generating four brake pressure commands, one brake command for each tire of the vehicle, to minimize deviation from a target trajectory is further based upon curvature of the trajectory data.

7. A product as set forth in claim 3 wherein a model predictive model, over a specified prediction horizon, performs a state estimation calculation, wherein the generating four brake pressure commands, one brake command for each tire of the vehicle, to minimize deviation from a target trajectory is further based upon cross track error data.

8. A product as set forth in claim 3 wherein a model predictive model includes an optimizer which produces a cost function as prediction compared to the reference trajectory, and wherein calculating, using a model predictive control module, a cost function is calculated continuously at every time stamp.

9. A product as set forth in claim 8 wherein the cost function is sent to a solver which determines a global optimal solution to applying brake pressure to steer the vehicle that minimizes the cost function with respect to a set of constraints.

10. A product as set forth in claim 9 wherein the set of constraints represents how much force the tire can provide.

11. A product as set forth in claim 9 wherein the solver continuously at each time stamp determines a new global optimal solution to applying brake pressure to steer the vehicle that minimizes the cost function with respect to a set of constraints.

12. A product as set forth in claim 9 further comprising the solver receiving or obtaining an adaptive constraint.

13. A product as set forth in claim 12 wherein the adaptive constraint is a lower force the tire can apply.

14. A product as set forth in claim 12 wherein the solver receiving or obtaining an adaptive constraint is based on a determination that the vehicle is on ice or snow.

15. A product as set forth in claim 3 wherein the using comprises using each of the side slip angle data, steering angle data, curvature of the trajectory data, cross track error data, and heading data in the model predictive control module to calculate four brake pressure commands.

16. A method comprising:

determining that a component of a vehicle steering system has failed or failing and in respond thereto using vehicle speed data in a linear predictive varying model to provide a prediction model and sending the predictive model to a model predictive control module;

using the predictive model to continuously calculating a cost function at every time stamp based on at least a predictive slip angle and heading error of a vehicle to provide a calculated cost function;

estimating the force that each tire of the vehicle can provide to provide an estimated tire force limit; and generating four brake pressure commands, one brake command for each tire of the vehicle, to minimize deviation from a target trajectory based upon the calculated cost function, and generating a propulsion command based on the calculated cost function and the estimated tire force limit.

17. A method as set forth in claim 16 wherein at least one of the four brake pressure commands is different than another one of the four brake pressure commands.

18. A method as set forth in claim 16 further comprising outputting the four brake commands.

19. A method as set forth in claim 16 further comprising outputting the four brake commands to a brake controller to steer the vehicle.

20. A method as set forth in claim 16 wherein a model predictive model includes an optimizer which produces a cost function as a prediction compared to the reference trajectory, wherein the cost function is sent to a solver which determines a global optimal solution to applying brake pressure to steer the vehicle that minimizes the cost function with respect to a set of constraints, wherein the set of constraints represents how much force the tire can provide.

* * * * *